INVENTORS
HENRI G. BUSIGNIES
PAUL R. ADAMS

Jan. 8, 1952   H. G. BUSIGNIES ET AL   2,581,358
DISPLAY SYSTEM INDICATING CRAFT POSITION AND MOVEMENT
Filed Feb. 5, 1946   3 Sheets-Sheet 3

INVENTOR.
HENRI G. BUSIGNIES
PAUL R. ADAMS
BY
ATTORNEY

Patented Jan. 8, 1952

2,581,358

UNITED STATES PATENT OFFICE 2,581,358

DISPLAY SYSTEM INDICATING CRAFT POSITION AND MOVEMENT

Henri G. Busignies, Forest Hills, N. Y., and Paul R. Adams, Cranford, N. J., assignors to Federal Telecommunication Laboratories, Inc., New York, N. Y., a corporation of Delaware Application February 5, 1946, Serial No. 645,669

7 Claims. (Cl. 88—24)

1

This invention relates to a display system, and more particularly to a system for representing aircraft as they appear around a central point, such as for example, an airport.

In air traffic control systems, particularly for use at an airport, it is desirable to visualize the position, altitude, direction of flight and identification of all aircraft within a given radius. For satisfactory visualization, it is desirable that this be done on a large scale, such as for example, by representation of the foregoing data in pictorial form on a screen of relatively large dimensions. It is desirable that such display systems be flexible enough to handle data from various sources. While the position and movement of aircraft can be shown on the screen of a cathode ray tube by the use of radar, and/or quasi-radar, as is, for example, described in the copending application, H. G. Busignies–103, Serial No. 593,603, filed May 14, 1945, for "Beacon System," it should be noted, however, that for real utility the pictorial display should be of larger size and better quality than obtainable on a cathode ray screen. The problems of adequate brilliance, and persistence are very difficult to solve in connection with cathode ray tube displays. Such cathode ray tube displays also contain a considerable number of extraneous indications, such as dots and streaks, which the experience of a trained operator enables him to disregard. Furthermore such cathode ray tube displays not only show the direction of flights poorly, if at all, but do not show the altitude of the plane or identity in any convenient form.

A suitable display system for airports is preferably designed to give a double check wherever possible. For example, when the radar operator sets the data he has obtained into a set of dials or other controls, he may make an error unless there is some method of checking back. It is desirable to have a clear pictorial representation of the data which the operator has set into his controls before the operator, to enable him to check on his control settings. In the case of data taken from telephonic reports, the operator should be able to compare instant reports as to position, altitude and speed, with prior reports or indications that he has received by radar. Since it is possible that at one time a large number of planes may reach a given airport, it is also desirable to have each operator capable of handling a considerable number of planes.

An object of the present invention is the provision of an improved display system for craft, particularly for aircraft around an airport.

2

Another object is the provision of such a display system which is flexible enough to use data from various types of sources.

Another object is the provision of a display system which provides a check on a considerable amount of the data handled so as to minimize the chances of error.

Still another object is the provision of a display system in which one operator can handle data for a considerable number of aircraft.

A further object is the provision of a display system capable of expansion to meet increasing traffic loads, and one which is characterized by having unit type construction so that additional units may be added to take care of any additional load.

A still further object is the provision of a display system that can be used with different airport layouts and arrangements without being tailor-made to suit each individual airport.

Still another object is the provision of a display system that can indicate a great deal of information in instantaneous and readily understandable form, such as for example position, direction of flight, altitude and identification of aircraft around an airport.

Still another object is the provision of a display system that can represent the expected future position of aircraft from information as to their present position and direction of flight.

Other and further objects of the present invention will become apparent and the invention itself will be best understood from the following description of an embodiment thereof, reference being had to the drawings, in which.

Figure 1:
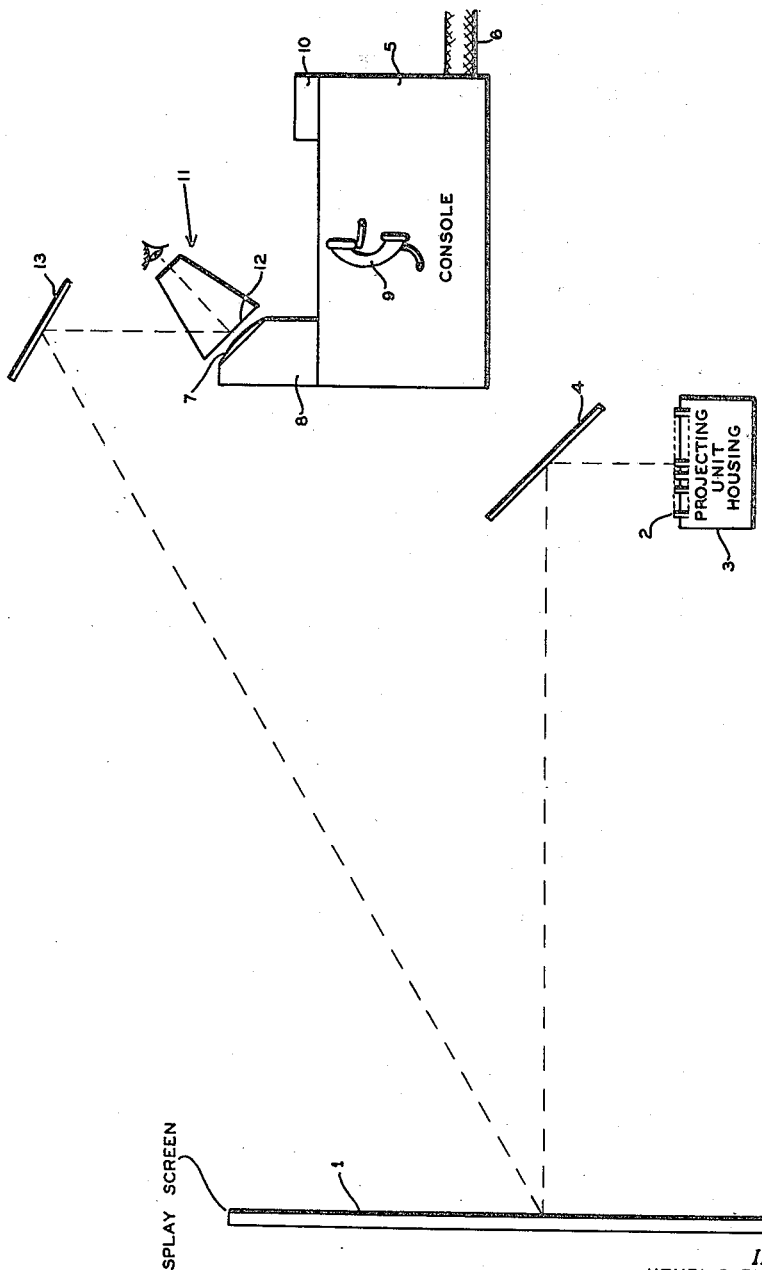
Fig. 1 is a schematic side elevational view of a display system embodying the present invention.

Referring now to Fig. 1, the display system there illustrated includes a screen 1, which is preferably of large size such as for example, 20 feet square, on which images representing airplanes are projected. The images on screen 1 are projected from, and controlled by, a plurality of projecting units 2, which may be assembled in a projector unit housing 3 and which projecting units direct their light against a tilted mirror 4, which reflects the light onto the screen 1. An operator controls the projector units 2 by manipulating the sets of controls at a console 5, which console contains one set of controls for each projector unit. The operator sets his controls according to information obtained from suitable sources such as radar, quasi-radar, telephonic and telegraphic sources, etc., which for the purposes of illustration, are shown as supplied to the console over a cable 6. The radar and quasi-radar information may produce indications on the screen 7 of a cathode ray tube 8, with telephonic information coming in over a telephone 9, and telegraphic and teletype information coming in over suitable instruments, such as telegraphic instruments and teletype tape, generally indicated by the numeral 10. From the information obtained from these sources, operator is enabled to suitably adjust the console controls to project an image on the screen which moves thereon and which represents the origin, direction of flight, instantaneous position, altitude, and identification of the various planes within the limits of the system. After operator has set these controls, he has a method of immediately checking the data he has set into the controls by comparison with prior information already set into the display system and by comparison with the indications appearing on the screen 7 of cathode ray tube 8. For this purpose, there is provided a viewing frame 11 including a tilted half silvered mirror 12 on which the operator can see an image of C. R. T. screen 7. At the same time the operator can see, superimposed on the image of C. R. T. screen 7, a picture of the display screen 1. For this purpose a tilted mirror 13 reflects the image of screen 1 downwardly into the viewing frame 11 and also onto the half silvered mirror 12. By the foregoing means the operator can compare the indications on the display screen with the indications on the cathode ray tube screen. The operator can compare the information he has just received and is setting into his controls with the position of flight of a plane or planes which he has formerly set into the controls. Since the projection units 2 project an image on screen 1, which represents by its movement the reported movement of the craft, it will be apparent that any discrepancy of the subsequently reported position with the position the plane should be at will be instantly obvious to the operator. If there is any apparent discrepancy, the operator is thereby warned to check on his information.

Figure 2:
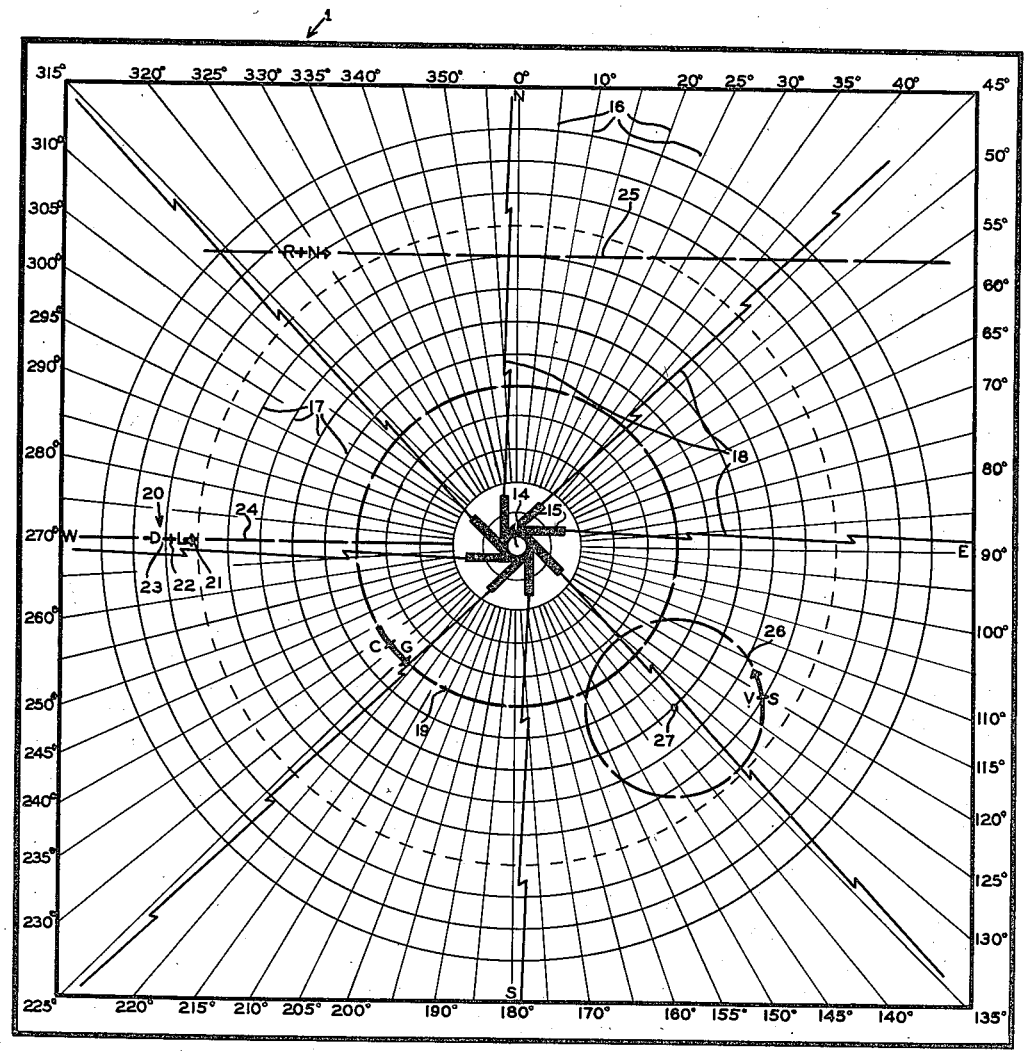
Fig. 2 is a front elevational view of the screen illustrated in Fig. 1.

Referring now to Fig. 2, the screen 1 may be rectangular in shape and laid out in polar coordinates with the airport 14 arranged at the center of the screen and with runways represented by the lines 15 radiating from the airport 14. The radial lines 16 extending from the airport indicate the various azimuthal angles with reference to the north, the angles being measured clockwise. The concentric circles, generally designated by the numeral 17, indicate the radial distance from the airport 14 and are marked 1M, 2M, etc. to indicate a distance of one mile, two miles, etc. from the airport center. The zig-zag lines 18 indicate localizer radio means projected along the various runways to lead airplanes into said runways. At a distance of five miles from the airport 14, a traffic circle 19 may be designated at which distance the planes circle the airport until directed to come in on a suitable runway. The screen 1 may also be marked to indicate various objects around the airport (not shown), such as for example, towers, high buildings, streets and other topographical features. Furthermore these markings may be produced on the screen by optical projection thereon from a suitable projector associated with a properly marked slide or film, instead of by physical application of these markings directly to the screen.

Aircraft may be represented on the screen 1 by arrows 20 whose head 21 shows the direction of flight, whose crossline 22 and body 23 at the point of intersection indicate the exact location or position of the plane, and which arrows are associated with letters identifying the plane, as for example, the arrow associated with the letters DL. To indicate the altitude of the plane, colors may be employed, and the head 21 and the body 23 of the arrows may be separately colored to provide an adequate amount of readily differentiable color combinations.

Various types of flights may be indicated on the screen 1. Flights directly toward the airport or directly away therefrom along one of the radii is hereinafter termed "radial flight." This is illustrated by the arrow DL, which is directed along the radius line 24 toward the airport 14. Straight line flight, but not on a radial line, is hereinafter termed "tangential flight." Tangential flight is illustrated by the arrow RM, which is travelling along the tangent line 25, which is, in this specific instance, at right angles to the north radius or 0° radius. Flight in a circle, with the airport at the center thereof, is hereinafter termed "circular flight." This is represented by the arrow CG travelling around the traffic circle 19 which has the airport 14 as its center. Flight in a circle, with the center other than the airport, is hereinafter termed "orbital flight." Orbital flight is illustrated by the arrow VS travelling in the circle 26 whose center 27 is offset from the airport 14.

Figure 3:
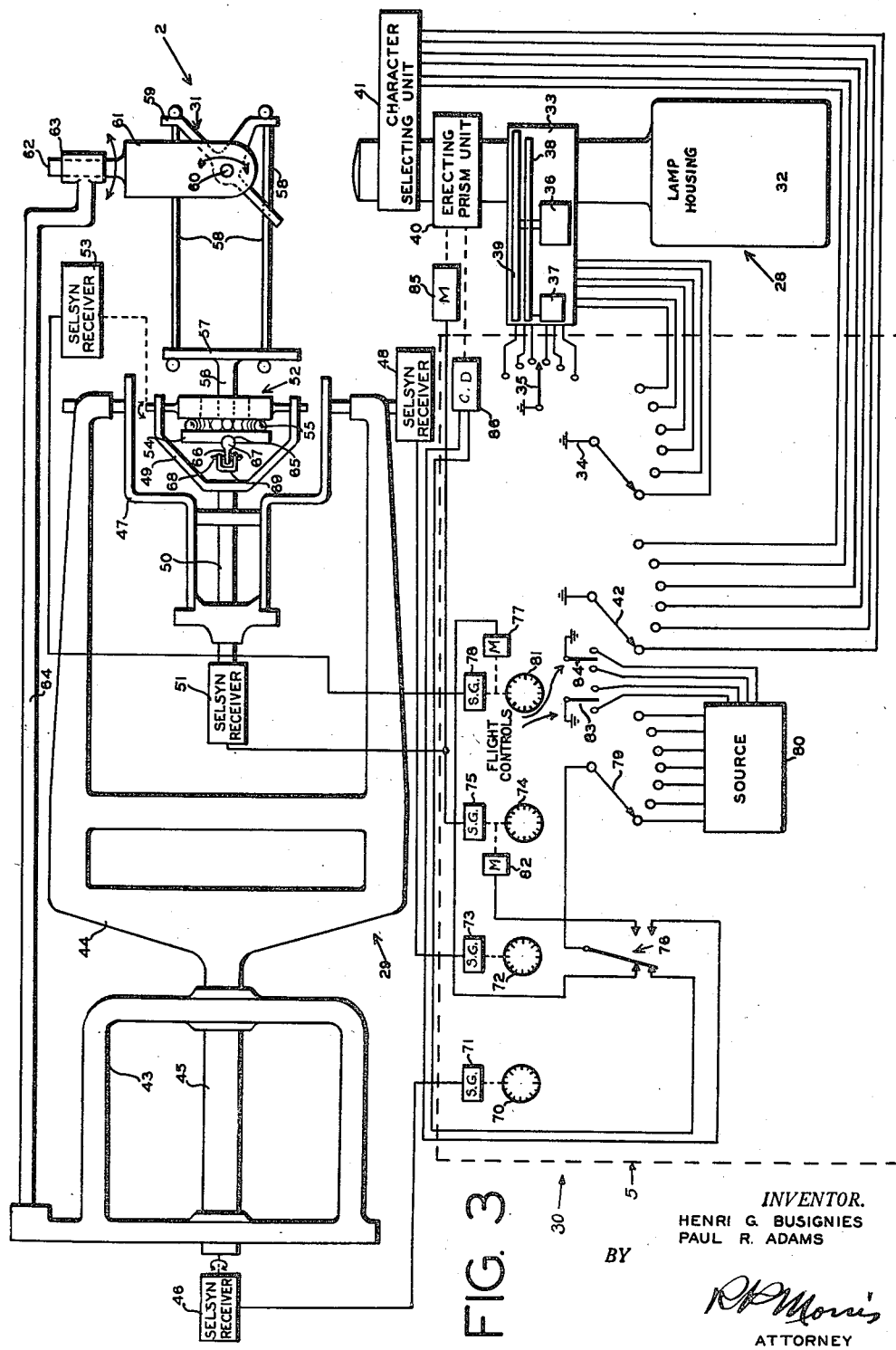
Fig. 3 is a schematic representation of a single projector unit and a set of controls for said unit, which controls are arranged in the console illustrated in Fig. 1.

Referring now to Fig. 3, each projector unit 2 is comprised of an image producer 28, which produces the image of an arrow suitably colored to indicate altitude and having associated therewith letters indicating identification, and a director unit 29, which serves to direct the image to the screen 1 and to move the image about in accordance with the flight of the aircraft represented by said image. Each projector unit is controlled by a set of controls 30 on the console 5 (Fig. 1). One set of controls 30 is illustrated in the dotted line rectangle in Fig. 3. The image from the image producer 28 is projected onto a tilted mirror 31 and from thence on to a reflector or mirror 4 (see Fig. 1) and from mirror 4 to the display screen 1. The director unit 29 controls mirror 31 so as to move the image to different positions on screen 1.

The image producer 28 includes a lamp housing 32 consisting of a source of light and including an optical system directing the light through a color selecting unit 33. The color selecting unit 33 is controlled by two selector switches 34 and 35 in console 5, one of which switches selects the color of the head of the arrow, and the other of which selects the color of the body of the arrow. These selector switches 34 and 35 respectively control motor means 36 and 37 which in turn rotate disks 38 and 39 within the color selecting unit. Disk 38 has various colored bodies of arrows arranged therein whereas disk 39 has various colored heads of arrows arranged therein. By suitably controlling switches 34 and 35, the right combination of arrow and head is moved into position in the path of the light from lamp housing 32 and the suitably colored image is then projected through erecting prism unit 40. The erecting prism unit 40 may be rotated to change the direction in which the image of the arrow points. The erecting prism unit 40 is controlled by means hereinafter described so as to indicate the proper direction of flight of the plane. The image projected through the erecting prism unit 40 is modified by a character-selecting unit 41 which may be in the form of a disk containing a plurality of different characters, such as letters and figures, with or without color coding, for denoting identity. These characters appear at the center of the optical system, the image of the arrow previously mentioned being positioned so the crossline is at said center. The character images are produced in a second image plane beyond the erecting prism unit so that they will always be projected right-side up. The character-selecting unit is controlled by a switch 42 on the console which is one of the switches of set 30. The complete image is projected onto the mirror 31 and thence to mirror or reflector 4 and from there on to the screen 1.

The director unit 29 may be described as consisting of two movements each adapted to produce motion according to polar coordinates, with one movement moving the center of movement of the other movement. Stated another way, the director unit may be considered as consisting substantially of a gimbal movement, which is adapted to rotate and tilt a second gimbal movement mounted thereon. The foregoing will be more clearly understood from the following description of an example thereof. The director unit 29 includes a stationary main frame 43; a main fork 44, having a shaft 45, which is adapted to be rotated in a given plane by a Selsyn or similar servo unit receiver 46; a sub-frame 47, which is carried by the main fork 44, and which can be tilted in a second plane substantially at right angles to said given plane by a Selsyn receiver 48; a sub-fork 49 which is mounted on a sub-frame 47 and is adapted to be rotated in a third plane substantially at right angles to said second plane by rotation of a shaft 50 by a Selsyn receiver 51; a rotating wobble ring 52 which is pivoted on the sub-fork 49 and which is adapted to be rotated in a fourth plane substantially at right angles to said third plane by a Selsyn receiver 53. The main fork 44 and the sub-frame 47 form one gimbal movement adapted to produce movements according to one set of polar coordinates, and wobble ring 52 and sub-fork 49 form the other gimbal adapted to move according to a second set of polar coordinates. A master wobble member 54 bears against the wobble ring 52 through the intermediary, for example, of a ballbearing ring 55, the master wobble member 54 being connected by a solid bar 56, to an associate master member 57, which in turn is connected through three tension rods 58 to a slave wobble member 59 on which the mirror 31 is mounted. The slave wobble member 59 is pivoted at 60, in a fork 61, which fork 61 has a shaft 62, arranged for rotation in a fixed collar 63, which is supported by a member 64, from the stationary main frame 43. The slave member 59 is adapted to be tilted in any particular direction because of the universal joint produced by pivot 60 and the rotation of shaft 62 in collar 63. The master wobble member 54 is prevented from rotating with wobble ring 52 by any suitable means. For example, for this purpose, a cylindrical opening 65 may be provided in the master wobble member 54 extending diametrically across it. A bar 66, which may be as long as the diameter of wobble member 54, and which has a cylindrical head 67 extending across the entire upper portion thereof, has its head 67 rotatably journaled within the opening 65. The bar 66 is pivoted at its center on a pivot 68 which is held in place on a stationary member 69. Bar 66 is prevented from rotation because of its connections to pivot 68, the latter being prevented from rotation by stationary member 69. Consequently master wobble member 54 cannot be rotated. Master wobble member 54 can, however, be freely wobbled since in one plane it can wobble by sliding on the cylindrical head 67 of bar 66 and in a second plane at right angles to said first plane it can wobble by moving bar 66 about its pivot 68.

The set of controls 30 for controlling the projector unit 2 may be divided into three groups, (1) origin controls (2) flight controls and (3) altitude and identity controls. The altitude and identity controls have already been described and include switches 34, 35 and 42. The origin controls consist of an azimuth control and a distance control for enabling the operator to set in polar coordinates the position of the origin of flight. In the case of straight flight, the origin of flight is the actual position of the aircraft at the moment when the setting is made. In the case of circular flight, the origin must be interpreted to be the center of the circle around which the aircraft is flying. Of the origin controls, the azimuth control 70 may be used to control a Selsyn generator 71 which in turn controls Selsyn receiver 46 to thereby control rotation of the shaft 45 of the main fork 44. The distance control 72 controls a Selsyn generator 73, which controls the Selsyn receiver 48 and the tilting of the sub-frame 47. By setting controls 70 and 72, the origin position of the aircraft is determined.

In the case of straight flight (both radial and tangential), the origin controls are adjusted to bring the arrow to a position on the screen representing the airplane's present position. The line along which the flight takes place is selected. This position is the center point of the polar coordinate movements of the gimbal including the sub-fork 49 and the wobble ring 52. From this center point the azimuth along which the flight is to occur is determined by adjusting the azimuth control 74 of the flight controls, which in turn controls a Selsyn generator 75, controlling Selsyn receiver 51. A switch 76 is moved so that contact is made for straight flight, the switch 76 in this position causing a motor 77 to rotate which rotates a Selsyn generator 78 connected to the Selsyn receiver 53. The rate at which motor 77 rotates, which therefore determines the rate at which the image of the arrow is moved along the screen in straight flight, is controlled by a switch 79 connected with a suitable source 80 of speed-determining energy. For example the source 80 may consist of a common group of alternators, or impulsing cams mounted on a common shaft and driven at a fixed rate by a synchronous motor. For slow speed the cams may be widely spaced and for higher speeds there may be many cams relatively close together. Once the speed has been selected and straight flight selected by switch 76, the image of the aircraft will automatically move with the selected speed in the desired direction starting from the selected origin point.

In the case of circular or orbital flight, the origin controls are adjusted to move the projected arrow to the center of the desired orbit and then control 81 which controls Selsyn generator 78 is adjusted so as to move the arrow outwardly from the center point by the requisite amount so as to bring this spot to the circumference of the proper size circle. The azimuth flight control 74 is adjusted to bring the arrow to the proper point or position on said circle. The selector switch 76 is then switched over to the orbital contact and the speed selector switch 79 is adjusted to the proper speed whereupon motor 82 drives Selsyn generator 75 to cause the arrow to automatically move around the selected center of the selected radius at a selected rate determined by the setting of the speed selector switch 79.

In case "accelerated time" or "reverse time" is required for prediction purposes, switches 83 and 84 respectively may be used for this purpose. This may be accomplished for example, in the case where cams are used on a common shaft by driving said common shaft with a high speed motor (set in motion by closing switch 83) through a differential and later when the shaft is to be restored to normal, it is merely necessary to drive the high speed motor back as many turns as it ran forward, the latter being accomplished by operating reversing switch 84.

In addition to the main functions above described, the azimuth flight control 74 and the selector switch 76 also jointly control the erecting prism unit 40 so as to rotate the arrow-shaped image. For straight flight, this image, the arrow, should point in the direction selected by the azimuth control 74 and for this purpose, the Selsyn generator 75 is also connected to an auxiliary Selsyn receiver 85 which controls the rotation of the erecting prism unit so that the arrow-shaped image is rotated in correspondence with the shaft 50 of the director unit 29. For orbital or circular flight, the arrow-shaped image should point at right angles to the line drawn from the center around which the airplane rotates to the point of origin of said plane instead of pointing along such line. Accordingly, the erecting prism unit 40 is also controlled by the switch 76 for controlling a control device 86 which rotates the erecting prism unit 40 an additional 90° when orbital flight is represented.

For finer adjustments, of course, it will be apparent that instead of a single Selsyn generator and single Selsyn receiver for controlling the various movements of the director unit 29, two generators and two receivers, one for course adjustments and one for fine adjustments may be employed in place thereof.

While we have described above various details of one embodiment of the present invention, it will be apparent to those versed in the art that variations of this embodiment may be made without departing from the teachings of this invention.

For example, while light rays have been used to project an image on the display screen in the embodiment described, it is possible to use invisible radiant energy, such as for example ultra-violet rays directed at a phosphorescent screen, for this purpose. The display screen may also be transparent and may be viewed from one side while projection on the screen takes place from the opposite side. Furthermore there may be associated with the display screen means responsive to light or other forms of radiant energy for controlling various utilization devices relating to air traffic control, display, etc.

While we have described above the principles of our invention in connection with specific apparatus and particular modifications thereof, it is to be clearly understood that this description is made only by way of example and not as a limitation on the scope of our invention.

We claim:

1. A display system for displaying the position and movement of craft about a given location, comprising a screen, means for producing an optical representation of a craft, means for projecting said representation on said screen, and means for controlling said projecting means for moving said representation on the screen to represent the movement of said craft, wherein said controlling means includes a stationary train, a first member arranged for rotation in one plane, a second member arranged for rotation in a plane at right angles to the plane of said first member and carried thereby, a third member mounted for rotation on said second member in a plane at right angles to the plane in which said second member rotates and carried by said second member, and a fourth member mounted on said third member for rotation in a plane at right angles to the plane in which said third member rotates.

2. A display system for displaying the position and movement of craft about a given location, comprising a screen, means for producing an optical representation of a craft, means for projecting said representation on said screen, and means for controlling said projecting means for moving said representation on the screen to represent the movement of said craft, wherein said controlling means includes a first member for rotation in a given plane, a second member mounted on said first member for rotation on the second plane at right angles to said given plane, a third member mounted on said second member for rotation in a third plane at right angles to said second plane, and a fourth member mounted on said third member for rotation in a plane at right angles to said third plane, means for rotating said first member in accordance with the azimuth of the position of the craft to be represented, means for rotating said second member in accordance with the radial distance of said craft from the given location, means for rotating said third member at a speed corresponding to the speed of the craft to indicate circular flight of the craft, and means for rotating said fourth member at a speed corresponding to the speed of the craft to indicate straight flight of said craft.

3. A display system for displaying the position and movement of craft about a given location, comprising a screen, means for producing an optical representation of a craft, means for projecting said representation on said screen, and means for controlling said projecting means for moving said representation on the screen to represent the movement of said craft, wherein said controlling means includes a first member for rotation in a given plane, a second member mounted on said first member for rotation in a second plane at right angles to said given plane, a third member mounted on said second member for rotation in a third plane at right angles to said second plane, and a fourth member mounted on said third member for rotation in a plane at right angles to said third plane, means for rotating said first member in accordance with the azimuth of the position of the craft to be represented, means for rotating said second member in accordance with the distance of said craft from the given location, means for rotating said third member at a speed corresponding to the speed of the craft to indicate circular flight of the craft, means for rotating said fourth member at a speed corresponding to the speed of the craft to indicate straight flight of said craft, and means for accelerating the speed of rotation of said third and fourth members to indicate the expected future position of said craft.

4. A display system according to claim 1 wherein said means for producing a representation of a craft includes means for selecting the color to denote a given characteristic of said craft and means for the production of said color in said representation.

5. A display system according to claim 1 wherein said representation is in the form of a figure pointing in a specific direction and further including means for rotating said figure to indicate the direction in which said craft is moving.

6. A display system according to claim 1 wherein said representation is in the form of an arrow, and further including means for selectively separately coloring the head and body of said arrow to denote given data with respect to said craft.

7. A display system according to claim 1 wherein said means for producing said representation includes means for producing an optical image which points in a given direction to represent the directional flight of said craft, and means for modifying said image to denote the identification of said craft.

HENRI G. BUSIGNIES.
PAUL R. ADAMS.

REFERENCES CITED

The following references are of record in the file of this patent:

UNITED STATES PATENTS

| Number | Name | Date |
| --- | --- | --- |
| 1,215,425 | Sperry | Feb. 13, 1917 |
| 1,967,541 | Schoute | July 24, 1934 |
| 1,980,886 | Talafre et al. | Nov. 13, 1934 |
| 1,988,931 | Alexanderson | Jan. 22, 1935 |
| 2,019,234 | Nistri | Oct. 29, 1935 |
| 2,131,952 | House | Oct. 4, 1938 |
| 2,251,984 | Cleaver | Aug. 12, 1941 |
| 2,266,741 | Crane et al. | Dec. 23, 1941 |
| 2,309,930 | Byerly | Feb. 2, 1943 |
| 2,316,550 | Bigalke | Apr. 13, 1943 |
| 2,342,938 | Hopkins | Feb. 29, 1944 |
| 2,408,848 | Hammond | Oct. 8, 1946 |
| 2,416,591 | Muntz | Feb. 25, 1947 |
| 2,421,077 | Miller | May 27, 1947 |
| 2,440,250 | Deloraine | Apr. 27, 1948 |
| 2,449,542 | Ayres | Sept. 21, 1948 |
| 2,479,569 | Harschel | Aug. 23, 1949 |